United States Patent
Mizikovsky et al.

(10) Patent No.: US 9,775,027 B2
(45) Date of Patent: Sep. 26, 2017

(54) METHOD FOR INTERWORKING AMONG WIRELESS TECHNOLOGIES

(75) Inventors: Semyon B. Mizikovsky, Morganville, NJ (US); Zhibi Wang, Woodridge, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 178 days.

(21) Appl. No.: 12/655,531

(22) Filed: Dec. 31, 2009

(65) Prior Publication Data

US 2011/0158162 A1    Jun. 30, 2011

(51) Int. Cl.
| | |
|---|---|
| H04M 1/66 | (2006.01) |
| H04W 12/04 | (2009.01) |
| H04L 29/06 | (2006.01) |
| H04W 88/06 | (2009.01) |
| H04W 12/06 | (2009.01) |

(52) U.S. Cl.
CPC ............ *H04W 12/04* (2013.01); *H04L 63/20* (2013.01); *H04W 12/06* (2013.01); *H04W 88/06* (2013.01)

(58) Field of Classification Search
CPC   H04M 1/66; H04M 1/68; H04M 3/16; H04Q 7/24
See application file for complete search history.

(56) References Cited

U.S. PATENT DOCUMENTS

| | | | |
|---|---|---|---|
| 8,353,011 B2 | 1/2013 | Bajko et al. | |
| 8,533,471 B2 | 9/2013 | Falk et al. | |
| 2004/0157585 A1* | 8/2004 | Sashihara | 455/411 |
| 2005/0113070 A1* | 5/2005 | Okabe | 455/411 |
| 2006/0205388 A1* | 9/2006 | Semple et al. | 455/411 |
| 2006/0286984 A1* | 12/2006 | Bonner | 455/445 |
| 2007/0217427 A1* | 9/2007 | Chung | 370/395.2 |
| 2008/0270794 A1* | 10/2008 | Falk et al. | 713/168 |

(Continued)

FOREIGN PATENT DOCUMENTS

| | | |
|---|---|---|
| CN | 101455025 | 6/2009 |
| CN | 101568108 | 10/2009 |
| CN | 101568108 A | 10/2009 |

(Continued)

OTHER PUBLICATIONS

PCT International Search Report dated May 24, 2011 (PCT/US2010/061964) 3 pages.

(Continued)

*Primary Examiner* — Anez Ebrahim
(74) *Attorney, Agent, or Firm* — Harness, Dickey & Pierce, P.L.C.

(57) ABSTRACT

A method is provided for interworking of mobility key management among access networks operating under different access technologies. The method is carried out by performing mobility key management by a core-network authentication server based on the access technology that a mobile terminal accessing a wireless network has selected for operation. The method of the invention defines authentication server behavior based on different access technologies and therefore solves the technology interworking issue seamlessly. The method of the invention also facilitates coexistence of more than two different access technologies without any need for each access technology to be modified in order to interwork with core network that is specified by another technology.

7 Claims, 1 Drawing Sheet

(56) References Cited

U.S. PATENT DOCUMENTS

2009/0109925 A1* 4/2009 Nakamura et al. ............ 370/331
2011/0110334 A1 5/2011 Hirano et al.

FOREIGN PATENT DOCUMENTS

| | | |
|---|---|---|
| JP | 2005-159495 | 6/2005 |
| JP | 2006-148203 | 6/2006 |
| JP | 2009-124684 A | 6/2009 |
| JP | 2009-188616 A | 8/2009 |
| KR | 10-2008-0015934 | 2/2008 |
| KR | 10-2008-0074956 | 8/2008 |
| KR | 20090004896 A | 1/2009 |
| WO | WO 2006-017129 | 2/2006 |
| WO | WO 2006134441 A1 | 12/2006 |
| WO | WO 2007/114623 | 10/2007 |
| WO | WO 2007-114623 | 10/2007 |
| WO | WO-2009/051400 A2 | 4/2009 |
| WO | WO 2009088252 A2 | 7/2009 |
| WO | WO 2009-136981 | 11/2009 |
| WO | WO 2009/157172 | 12/2009 |

OTHER PUBLICATIONS

3GPP TS 32.295 version 8.0.0 Release 8, ETSI TS 132 295, V8.0.0, Technical Specification, Jan. 2009.
Applicant response to Written Opinion of International Search Report for related International Application No. PCT/US2010/061964.
Aug. 29, 2013 Notice of Preliminary Rejection issued in corresponding KR Application No. 10-2012-7019887 (with translation).
Aug. 29, 2013 Notice of Reason for Refusal issued in corresponding Japanese Application No. 2015-547167 (with translation).
Apr. 22, 2014 Notice of Final Rejection issued in corresponding Korean Application No. 10-2012-7019887 (with translation).
Mar. 27, 2014 Decision of Rejection issued in corresponding Japanese Application No. 2012-547167 (with translation).
First Office Action for corresponding Chinese patent application No. 201080059929.1 mailed on Jul. 16, 2014 with English translation.
Oct. 20, 2014 Korean Office Action issued in corresponding Korean Application No. 10-2014-7020687 (with translation).
C. Rigney, et al., Remote Authentication Dial in User Service, Draft Standard, issued on Jun. 2000, RFC 2865, p. 60-61, https://tools.ietf.org/html/rfc2865.

* cited by examiner

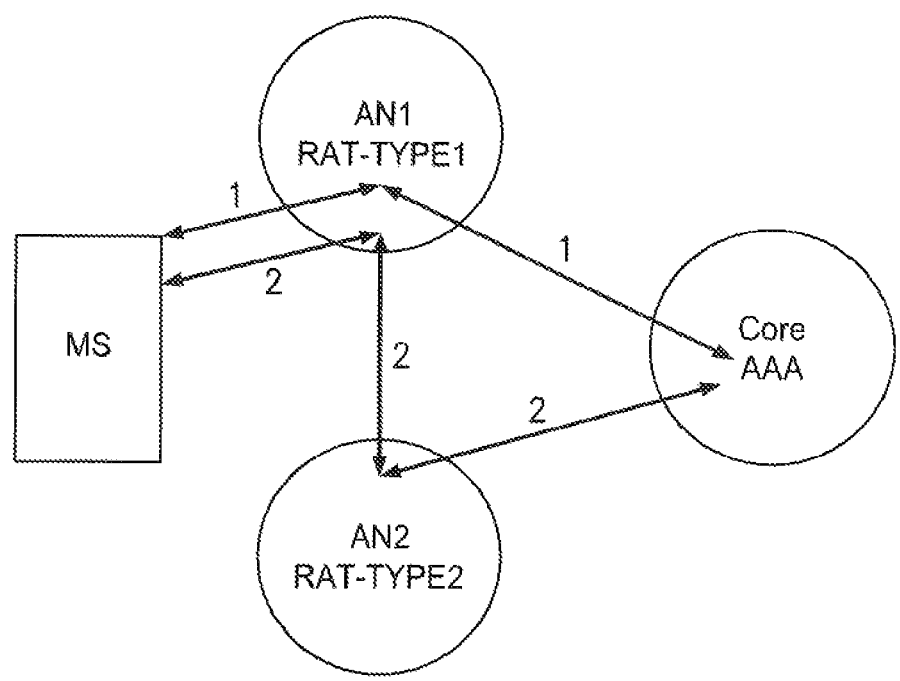

METHOD FOR INTERWORKING AMONG WIRELESS TECHNOLOGIES

FIELD OF THE INVENTION

The present invention generally relates to security associations between mobile terminals and wireless communication networks.

BACKGROUND OF THE INVENTION

Networks for wireless communication include various types of radio access technologies (RATs), for example, High Rate Packet Data (HRPD), Long Term Evolution (LTE) and Worldwide Interoperability for Wireless Access (WiMAX) types. Such diverse networks have benefits both for the network users and the network operator. The user terminal can switch to the RAT that is most suitable at the relevant time. The operator can do load-sharing between RATs so as to improve network usage and performance.

An inter-RAT handover is process in which a mobile terminal switches from using a first radio access system having a first radio access technology (such as LTE) to a second radio access system having a second radio access technology (such as WiMAX).

Standards have evolved (via standards organizations) for different wireless technologies that specify how each network element should interface with the network element so that the network elements manufactured by different vendors can work together. Each standard specifies the interfaces between network elements.

Because mobile terminals are linked to a serving network by RF signals whose origin cannot be readily identified with any degree of certainty, an important aspect of wireless communication is the establishment and maintenance of a security association between the mobile terminal and the serving network, to establish that mobile terminal identity and that it is an authorized user of the network. This security association is created with the assistance of the mobile user-subscriber's home network during initial authentication of the mobile terminal entering the network, and is normally carried out by, or under the control of an authentication server in that home network. Typically that authentication server is implemented as an Authentication, Authorization and Accounting (AAA) server. Such authentication is generally implemented via a series of security keys, either known to the participants, or exchanged among relevant network and mobile terminal entities via cryptographic hashes of the key.

Since different wireless standards specify different security mechanisms to authenticate and authorize the end user, as well as different methodologies to compute resulting session keys, the interworking among different technologies becomes a complicated issue for operators. In the art, interworking with two technologies requires that either one technology be modified to be aligned with the other technology, or that both technologies be modified to another common standard.

SUMMARY OF INVENTION

This invention solves the wireless technology interworking mobility key management issue by performing AAA mobility key management based on the terminal access technology. The invention methodology seamlessly solve the access technology interworking problem even if there are multiple access technologies that share the same core network, without requiring the terminals of different access technologies to implement the mechanism used by the core network.

BRIEF DESCRIPTION OF THE FIGURES

The teachings of the present invention can be readily understood by considering the following detailed description in conjunction with the accompanying drawings, in which:

FIG. 1 depicts a system architecture in which the method of the invention may be implemented.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of an interworking between a WiMAX network and an LTE Evolved Packet Core (EPC) network. It should be clear, however, that the invention will be applicable to interworking among other wireless system technologies, and that the use the WiMAX/EPC interworking application in the description following is solely for purposes of illustrating the invention principles, and is not in any way intended to limit the scope of the invention.

Wireless networks operate according to standards and/or protocols that allow roaming mobile units to hand off between the interconnected base stations so that call sessions are not interrupted when the mobile unit moves between geographic areas (or cells) served by different base stations. One example of a communication protocol that supports user mobility is Mobile Internet Protocol (MIP). Mobile IP is an Internet Engineering Task Force (IETF) protocol that allows mobile units to move from one network to another while maintaining a permanent IP address. A mobile unit that operates according to Mobile IP is assigned a permanent home address on its home network and a care-of address that identifies the current location of the mobile unit within a network and its subnets.

A Mobile IP network includes a mobile node (MN), a Home Agent (HA) associated with the MN, a Foreign Agent (FA) for an MN which has roamed outside its home network, and an Authentication, Authorization and Accounting (AAA) node. When an MN moves from its home network to a visited network, it will get an IP address ("care-of" address) from the FA which is registered with the HA, so that the HA knows where the MN has moved to. Thus the HA and is able to forward IP traffic addressed to the MN, by sending it to the FA then serving the MN. For security reasons, the MN registration mechanism is protected by mobility keys. The key used for the registration from MN and FA to the HA has to the same as the key used by the HA to validate the registration; otherwise the registration will fail.

The issue of interworking between different technologies that are specified by different standards arises because differently computed keys are used in different network elements for the interworking. For example, if one key is used for the mobility registration from the mobile toward the network in which the authentication is executed, and if the HA retrieves mobility keys from the AAA server that is calculated based on formula specified by another standard, the registration message cannot be validated by the HA. This will lead to registration failure, and interworking accordingly becomes impossible.

It is often the case in contemporary wireless architectures that the core network operator can support different access technologies. Indeed, the current standard allows one operator with its own core network to incorporate different access technologies that are different from the core network. For example, a 3GPP EPC core network operator can serve end users with terminals that support WiMAX as the wireless access technology. In the case of interworking between a WiMAX access network and an EPC core network, the wireless access network is provided by the WiMAX network, under standards and protocols established by the WiMAX Forum, while the core network is an EPC network, operating under standards and protocols specified under the 3GPP standard. Since different wireless standards specify different security mechanisms to authenticate and authorize the end user, as well as different methodologies to compute resulting session keys, the interworking among different technologies cannot readily be carried out.

There is no current solution for a single AAA server that interworks with more than one wireless access technology. For example, the current 3GPP standard only specifies one way to generate the mobility root key and Mobile IP keys to interwork with all other technologies. All other wireless access technologies have to modify the root key and Mobile IP keys derivation formulas in order to do interworking with the 3GPP EPC core network.

The inventors have developed a methodology for interworking among access technologies operating under diverse standards, and without any changes being required of either access technology. That methodology will be described hereafter in connection with FIG. 1, which depicts an architecture for a mobile station (MS) served by two access networks (AN1 and AN2) operating under different RATs, and served by a common AAA server.

As explained in more detail below, the basic thrust of the invention methodology is that the access technology interworking mobility key-management issue is addressed by performing the AAA mobility key management based on the access technology chosen by the MS. Thus, when the AAA server that resides in the core network detects an MS that is from an access network that has different technology than the core network, it generates the mobility root key and Mobile IP keys based on the standard for the MS's access technology. Therefore, the same mobility key will be used in the calculation of the authentication extension in the mobility registration message, and for the validation of the message by the HA (when the HA retrieves the mobility keys from the AAA that resides in the core network). Since the AAA server calculates the mobility keys using the formula for the standard under which the MS is operating, the HA will successfully validate the mobile registration from the MS.

It follows that the same core network AAA will generate the mobility root key and Mobile IP keys differently if another mobile node from a third access technology network is trying to access the same core network.

With reference now to FIG. 1, a multi-mode MS is illustrated as able to access a core network using two different technologies: RAT-TYPE1 (illustrated as AN1) and RAT-TYPE2 (illustrated as AN2). The MS is further characterized as being able to send messages to the network with only one access technology at a time, i.e., the MS is provided as dual mode, single transmitter. (It should, however, be understood that the invention methodology is also applicable to a dual-radio mobile—i.e., a mobile with two transmitter/receivers.) When the MS moves from one area that is covered by RAT-TYPE1 to another area that is covered by RAT-TYPE2, the MS needs to perform a handover procedure to maintain on-going session continuity. The handover procedure is composed of pre-registration, mobility key derivation, and other procedures not material to discussion of the invention.

When MS registers on the Core network through the AN1 (Transactions 1), the Network Access Server (not shown) at the AN1 will identify itself as RAT-TYPE1 access technology, and both the MS and the AAA server will compute the keys according to the standards and protocols of RAT-TYPE1.

As part of the handover procedure, the MS preregisters for the AN2 via an air link from itself to AN1 and a tunnel from AN1 to AN2, and sends AAA authorization/authentication messages from AN2 to the AAA server in the Core network. The MS is still operating via the air link with AN1 at that point, but AN2 will identify itself to the Core network as the RAT-TYPE2. Therefore, the AAA server at the Core network will compute the keys according to the standards and protocols of RAT-TYPE2.

The MS knows what RAT-TYPE it will use with AN2, and thus its preregistration for the handover to AN2 will include an indication of RAT-TYPE2, such as, for example, via the NAS-Port Type parameter included in the Access Request message to the AAA server.

Thus, when the AAA server detects the Access Request for the MS handover from AN1 to AN2, it knows that the MS will now be operating with RAT-TYPE2 and will generate the mobility root key and Mobile IP keys based on the RAT-TYPE2 standard. Accordingly, the same mobility key will be used in the calculation of the authentication extension in the mobility registration message, and for the validation of the message by the HA (when the HA retrieves the mobility keys from the AAA).

In the illustrative applications of the invention methodology to WiMAX and 3GPP EPC interworking, the wireless access network is WiMAX and the core network is a 3GPP EPC network. When the AAA server that resides in the EPC core network detects a mobile that is from a WiMAX access network, it will generate the mobility root key and Mobile IP keys according to the WiMAX standards and protocols. Accordingly, the MS can access the 3GPP EPC core network and core network services from the WiMAX access network (ASN) without modification. Alternatively, the same EPC core network and AAA server can serve an MS with other access technologies and the AAA server will generate the mobility root key and Mobile IP keys differently for the MS using the other access technology.

With the methodology of the invention, many users from different access networks can share the same core network and all the services in the core network, such as LBS, IMS, Unified Messaging, etc. The approach of the invention allows more than two different access technologies to coexist without requiring the MS to change the security key mechanism specified for the access technology that it operates under. The AAA server simply behaves as if it is specified by the same access technology standard as that of the MS—i.e., the AAA server in the core network mimics the access technology of the MS, where the MS may operate under varied access technologies.

Herein, the inventors have disclosed a method for maintaining authentication of a roaming mobile terminal, where the mobile terminal may be operating under a different access technology than the core network. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system for providing handover of a mobile node moving from a first coverage area applying a first radio access technology to a second coverage area applying a second radio access technology, and wherein the mobile node has initially established an authenticated registration with a network associated with the first coverage area pursuant to standards of the first radio access technology, the method comprising:
   receiving, at an authentication server, a message from the mobile node requesting registration for access to the second coverage area, the message identifying the second radio access technology applied in the second coverage area and including a first authentication extension, the authentication server initially using the first access technology that is different than the second access technology;
   generating, at the authentication server, authentication keys and a second authentication extension for the requested access registration according to standards established for the second radio access technology; and
   validating, at the authentication server, the received registration request message using the first and second authentication extensions,
   wherein the mobile node generates the first authentication extension without receiving any information from the authentication server identifying the second radio access technology.

2. The method of claim 1 wherein the message from the mobile node requesting access to the second coverage area is sent via an access node serving the first coverage area and thence via a connection between the access node serving the first coverage area and a second access node serving the second coverage area.

3. The method of claim 2 further including a connection between the second access node and the authentication server.

4. The method of claim 1 wherein the first radio access technology is established pursuant to 3GPP standards.

5. The method of claim 4 wherein service in the first coverage area is provided pursuant to Evolved Packet Core standards.

6. The method of claim 1 wherein the second radio access technology is established pursuant to WiMAX standards.

7. The method of claim 1 wherein the authentication server is an Authentication, Authorization and Accounting (AAA) server.

* * * * *